US008327320B2

(12) United States Patent
Lamothe

(10) Patent No.: US 8,327,320 B2
(45) Date of Patent: Dec. 4, 2012

(54) PROCESS MODEL LEAN NOTATION

(75) Inventor: Ricardo Panero Lamothe, Malaga (ES)

(73) Assignee: Accenture Global Services Limited, Dublin (IE)

( * ) Notice: Subject to any disclaimer, the term of this patent is extended or adjusted under 35 U.S.C. 154(b) by 1126 days.

(21) Appl. No.: 12/204,419

(22) Filed: Sep. 4, 2008

(65) Prior Publication Data

US 2010/0031263 A1 Feb. 4, 2010

(30) Foreign Application Priority Data

Jul. 31, 2008 (EP) .................................... 08380241

(51) Int. Cl.
*G06F 9/44* (2006.01)
(52) U.S. Cl. ................... 717/104; 705/8; 705/9; 705/58
(58) Field of Classification Search .................. 717/104; 715/762, 763; 705/8, 9, 58
See application file for complete search history.

(56) References Cited

U.S. PATENT DOCUMENTS

| | | | |
|---|---|---|---|
| 6,817,008 B2* | 11/2004 | Ledford et al. ............... | 717/102 |
| 6,976,257 B2* | 12/2005 | Leymann et al. ............. | 718/103 |
| 7,024,669 B1* | 4/2006 | Leymann et al. ............. | 718/100 |
| 7,516,155 B2* | 4/2009 | Ivan et al. ............... | 1/1 |
| 8,145,595 B2* | 3/2012 | Kloppmann et al. ......... | 707/608 |
| 2004/0267588 A1* | 12/2004 | Bevington et al. ................. | 705/9 |
| 2005/0149375 A1* | 7/2005 | Wefers ............... | 705/9 |
| 2006/0015380 A1* | 1/2006 | Flinn et al. ........................ | 705/7 |

OTHER PUBLICATIONS

Tyson R. Browning, "Process Integration using the Design Structure Matrix", Mar. 12, 2002.*
Serkan Tavasli, "Six Sigma Performance Measurement System", Sep. 2006.*
European Patent Office dated Dec. 5, 2008 for co-pending European Patent Office Application No. 08380241.3.
"Statement in Accordance with the Notice from the European Patent Office Dated Oct. 1, 2007 Concerning Business Methods," Journal of the European Patent Office, Nov. 1, 2007, pp. 592-593.

* cited by examiner

*Primary Examiner* — Phillip H Nguyen

(57) ABSTRACT

A process model lean notation provides an easy to understand way to categorize the process elements of a process using a process definition grammar. Process model lean notation allows an organization to rapidly identify the process elements of a process and the interactions between the process elements, and produces a process categorization that includes an ordered sequence of the process elements. A process categorization provides a structured presentation of the process elements and clearly indicates for each process element the task accomplished, the actor responsible for and/or performing the task, the tool that may be used to perform the task, and the work product that may result by performing the task.

23 Claims, 14 Drawing Sheets

| First and Second Process Level Tags | 102 Process Element (PE) ID | 104 Actor Role ID | 106 Machine ID | 108 Work Product ID | 110 PEC Indicator | 112 Task ID | 114 |
|---|---|---|---|---|---|---|---|
| Meta.Owner | 116 Owner Identifier | | | | | Owner of the process. | |
| Meta.Rel | 118 Release Date | | | | | Release date of the last version of the process. | |
| Meta.Version | 120 Version Identifier | | | | | Version of the process. | |
| Meta.Author | 122 Author Identifier | | | | | Author of the release. | |
| Meta.RevHistory | 124 Revision History Identifier | | | | | Revision history summary for the related version. | |
| Meta.Policy | 126 Policy Identifier | | | | | Policy that applies to the process. | |
| Methodology ID | 128 Methodology PE Identifier | | | | | Mapping to a specific methodology. | |
| Proc.Seq | 130 Sequence 123 | SQA | PEM 104 | Defect Report | Complete | An ordered sequence process element. | |
| Proc.Cond | 132 IF-ELSE-END IF identifier | | | | | Conditional process element identifier. | |
| Proc.Loop | 134 For Each-Do While identifier | | | | | Loop process element identifier. | |
| Proc.Call | 136 Sub-Process Identifier | | | | | Call to another process or sub-process. | |
| Proc.State | 140 State Identifier | | | | | Current State indicator of the process. | |
| Proc.StateChg | 142 State Change Identifier | | | | | State change indicator. | |

| First and Second Process Level Tags | Process Element (PE) ID 102 | Actor Role ID 104 | Machine ID 106 | Work Product ID 108 | PEC Indicator 110 | Task ID 112 | 114 |
|---|---|---|---|---|---|---|---|
| SIPOC.ProcID | 202 Audit Name 1 | | | | | Identifier of the process. | |
| SIPOC.Supp | 204 Audit Supplier Name 1 | | | | | Suppliers of the process. | |
| SIPOC.In | 206 Audit Input Name 1 | | PEM | | | Inputs to the process. | |
| SIPOC.InReq | 208 Audit Input Requirement 1 | | | | | Requirements for the input. | |
| SIPOC.Proc | 210 Audit.1A | | | | | High level process element of a process or sub-process | |
| SIPOC.Cust | 212 Audit Process 1A | | | | | Customer of the process. | |
| SIPOC.Out | 214 Audit Output 1A | | | | | Output of the process related to the Customer. | |
| SIPOC.OutReq | 216 Audit Output 1A Requirement 3 | | | | | Requirement for the output. | |
| Perf.Y | 218 Audit 1A Measurement 1 | | | | | Performance measurement of the output of the process. | |
| Perf.Goal | 220 Audit 1A Goal 1 | | | | | Target performance of the process. | |
| Perf.X | 222 Audit 1A Perf Factor 1 | | | | | Performance for the input/ in-process factors. | |
| Perf.Aux | 224 Audit 1A Intermed Measurement 1 | | | | | Intermediate performance measurements of the ouput | |
| Perf.F(X) | 226 Audit 1A Relationship 6 | | | | | Relationship between the Perf.Y, Perf.Aux, & Perf.X. | |

| Process ID | 502 |
|---|---|
| Sequence ID | 504 |
| Condition ID | 506 |
| Loop ID | 508 |
| Process Call ID | 510 |
| Process State ID | 512 |
| Process State Change ID | 514 |

500

| First and Second Process Level Tags | 102 | Process Element (PE) ID | 104 | Actor Role ID | 106 | Machine ID | 108 | Work Product ID | 110 | PEC Indicator | 112 | Task ID | 114 |
|---|---|---|---|---|---|---|---|---|---|---|---|---|---|
| Proc.Loop | 702 | Non-Compliance_Loop1 | 704 | | | | | | | | | For each identified non-compliance issue. | 706 |
| Proc.State | 708 | Solving1 | 710 | | | | | | | | | Resolution of non-compliance. | 712 |
| Proc.Seq | 714 | Solving1_Seq1 | 716 | Actor 3 | 718 | PEM | 720 | Defect 1 | 722 | | | Define the action to be performed. | 724 |
| Proc.Seq | 726 | Solving1_Seq2 | 728 | Actor 3 | | PEM | | Defect 2 | | | | Identify the owner of the action to be performed. | |
| Proc.Seq | 730 | Solving1_Seq3 | 732 | | | | | | | | | Perform the action. | |
| Proc.Seq | 734 | Solving1_Seq4 | 736 | | | | | | | | | Change the Process state to Solved. | |
| Proc.State | 738 | Solved1 | 740 | | | | | | | | | Non-compliance solved. | |
| Proc.Seq | 742 | Solved1_Seq1 | 744 | Actor 4 | | PEM | | Defect 3 | | | | Evaluate the resolution of non-compliance. | |
| Proc.StateChg | 746 | Solved1_StateChg | 747 | Actor 4 | | PEM | | Defect 4 | | | | Change state: New, Closed. | |
| Proc.State | 750 | ChangeApproved1 | 752 | | | | | | | | | Process change request approved. | |
| Proc.Seq | 754 | ChangeApproved1_Seq1 | 756 | Actor 5 | | PEM | | Updated ChgControl | | | | Perform the change to the process. | |
| Proc.StateChg | 758 | ChangeApproved1_StateChg | 760 | Actor 5 | | PEM | | Defect 5 | | | | Change state: Changed. | |
| Proc.Loop | 762 | Non-Compliance_Loop2 | 764 | | | | | | | | | End For | |

FIG. 7

| First and Second Process Level Tags | Process Element (PE) ID 102 | Actor Role ID 104 | Machine ID 106 | Work Product ID 108 | PEC Indicator 110 | Task ID 112 114 |
|---|---|---|---|---|---|---|
| Proc.State | 802 Waiver Requested (WR) 1 | | | | | 804 Compliance Waiver Requested. 806 |
| Proc.Cond | 808 WR Conditional 1 | | | | | 810 If waiver requires approval 812 |
| Proc.Seq | 814 WR Conditional 1 Seq 1 | Actor 3 | PEM | Email | | 816 Request approval. |
| Proc.Seq | 818 WR Conditional 1 Seq 2 | Actor 6 | PEM | Email | | 820 Receive Approval or Rejection. |
| Proc.Cond | 822 WR Conditional 2 | | | | | 824 Else |
| Proc.Seq | 826 WR Conditional 2 Seq 1 | Actor 3 | PEM | Defect X | | 828 Evaluate the waiver request. |
| Proc.Cond | 830 WR Conditional 3 | | | | | 832 End IF |
| Proc.StateChg | Waiver Approved 1 | Actor 3 | PEM | Defect Y | | Change state: Waiver Approved |

| First and Second Process Level Tags | 102 | Process Element (PE) ID | 104 | Actor Role ID | 106 | Machine ID | 108 | Work Product ID | 110 | PEC Indicator | 112 | Task ID | 114 |
|---|---|---|---|---|---|---|---|---|---|---|---|---|---|
| SIPOC.ProcID | 942 | Patent Filing Process | 968 | | | | | | | | | A company's process to file a patent. | 912 |
| Meta.Owner | 943 | CompanyName | 969 | | | | | | | | | Name of the Company. | 913 |
| Meta.Version | 944 | 0.1 | 970 | | | | | | | | | Version of the patent filing process. | 914 |
| Meta.Rel | 945 | MM/DD/YYYY | 971 | | | | | | | | | Release date of this patent filing process version. | 915 |
| Meta.Author | 946 | Author Name | 972 | | | | | | | | | Author of the patent filing process. | 916 |
| Meta.Policy | 947 | Disclosure Requirement | 973 | | | | | | | | | Submit disclosure form to Company IP department. | 917 |
| SIPOC.Supp | 948 | Inventor Name | 974 | | | | | | | | | Supplier: Inventor of the innovation. | 918 |
| SIPOC.In | 949 | | | | | | | | | | | Input: Idea | 919 |
| SIPOC.InReq | 950 | | | | | | | | | | | Idea must be novel and non-obvious | 920 |
| SIPOC.Proc | 951 | | | | | | | | | | | Document Idea | 921 |
| SIPOC.Proc | 952 | | | | | | | | | | | Submit disclosure form. | 922 |
| SIPOC.Proc | 953 | | | | | | | | | | | Review disclosure form. | 923 |
| SIPOC.Proc | 954 | | | | | | | | | | | Draft Patent Application | 924 |

FIG. 9b

| First and Second Process Level Tags | Process Element (PE) ID 102 | | Actor Role ID 106 | | Machine ID 108 | | Work Product ID 110 | | PEC Indicator 112 | Task ID 114 | |
|---|---|---|---|---|---|---|---|---|---|---|---|
| SIPOC.Proc | 955 | | | | | | | | | Review and sign application. | 929 |
| Proc.Seq | 956 | | Attorney | 977 | Email Software | 983 | E-mail | 989 | | Contact Inventor for review. | 930 |
| Proc.Loop | 957 | | | | | | | | | While clarifications are needed (loop) | 931 |
| Proc.Cond | 958 | | | | | | | | | If additional documentation is needed. | 932 |
| Proc.Seq | 959 | | Inventor | 978 | Authoring Tool | 984 | Additional Documents | 990 | | Prepares additional documentation. | 933 |
| Proc.Seq | 960 | | Inventor | 978 | Email Software | 983 | E-mail | 989 | | Inventor submits additional documentation. | 934 |
| Proc.Seq | 961 | | Attorney | 977 | Meeting Software | 985 | Meeting Identifier. | 991 | | Schedule disclosure review meeting. | 935 |
| Proc.Seq | 962 | | Attorney / Inventor | 977 / 978 | Phone | 986 | Action Items | 992 | | Conduct disclosure review meeting. | 936 |
| Proc.Seq | 963 | | Attorney | 977 | Email Software | 983 | E-mail | 989 | | Report disclosure review meeting results. | 937 |
| Proc.Cond | 964 | | | | | | | | | No more clarifications needed. (end while loop) | 938 |
| SIPOC.Proc | 965 | | | | | | | | | File the Patent Application with the Patent Office. | 939 |
| SIPOC.Cust | 966 | Company Name 975 | | | | | | | | Customer of the patent filing process. | 940 |
| SIPOC.Out | 967 | Patent Application Filing Receipt. 976 | | | | | | | | Patent Office Issues Filing Receipt. | 941 |

| Process Categorization | 1026 |
|---|---|
| Ordered Sequence of Process Elements | 1202 |

| First Process Element (FPE) | 1204 |
|---|---|
| FPE - FP Level Tag | 1210 |
| FPE - SP Level Tag | 1216 |
| FPE - Process Element Attributes | 1222 |
| FPE - Process Element ID | 1228 |

| Second Process Element (SPE) | 1206 |
|---|---|
| SPE - FP Level Tag | 1212 |
| SPE - SP Level Tag | 1218 |
| SPE - Process Element Attributes | 1224 |
| SPE - Process Element ID | 1230 |

| Nth Process Element (NPE) | 1208 |
|---|---|
| NPE - FP Level Tag | 1214 |
| NPE - SP Level Tag | 1220 |
| NPE - Process Element Attributes | 1226 |
| NPE - Process Element ID | 1232 |

1200

FIG. 12

PROCESS MODEL LEAN NOTATION

BACKGROUND OF THE INVENTION

1. Priority Claim

This application claims the benefit of priority to EPO application Ser. No. 08380241.3, filed on Jul. 31, 2008.

2. Technical Field

This disclosure concerns a system and method for categorizing a process. In particular, this disclosure relates to a system and method to efficiently identify discrete process elements of a process, and the interactions between the process elements, in order to produce a process categorization that includes an ordered sequence of the process elements.

3. Background Information

Organizations continue to face demands for more efficient and effective ways to analyze, model and improve business processes, while the complexity of known business process modeling (BPM) tools grow more sophisticated and resource intensive. Business process engineers often require significant training, expertise and continued effort to maintain proficiency in the utilization of known BPM tools. Today, organizations have very little time to digest and comprehend the results produced by such complex BPM tools. Consequently, many organizations fail to realize the benefits of engaging BPM initiatives.

Known BPM tools provide a way to identify and record the process elements of a process, analyze the process element of the process and identify modifications that may improve the performance of the process. BPM tools identify direct relationships between process elements and the requirements addressed by each process element. BPM tools further provide process performance information that can be examined to quantitatively evaluate the performance of a process.

BPM tools may be categorized into three types, including: process mapping modeling tools; modelers for software development; and modeling tools embedded in BPM systems. Process mapping modeling tools include MS-Visio®, ProVision Tools® from Proforma Corp., and Business Architect (ARIS)® from IDS Scheer. Modelers for software development include Rational Software Architect® from IBM that is capable of generating unified modeling language (UML) diagrams. Modeling tools embedded in BPM systems include Websphere® from IBM that is capable of generating workflow applications, Netweaver® from SAP, and Fusion® from ORACLE. Some of the BPM language standards include: business process modeling notation (BPMN); business process execution language (BPEL), unified modeling language (UML); and the object process methodology (OPM).

Business process modeling notation (BPMN) provides a graphical notation scheme for drawing business processes in a workflow. BPMN further provides a set of graphical elements used to produce business process diagrams (BPDs). BPMN graphical elements include: flow objects; connecting objects; swimlanes; and artifacts. BPMN models can be ambiguous and confusing because the BPDs can be overloaded with information and modeling a single business process may result in different BPMN notation variations. In other words, for a single business process multiple different BPMN representations of the process may result. Communicating BPMN models based on a business process diagram without additional information is difficult and BPMN does not provide support for representing process states.

Unified/universal modeling language (UML) provides a standardized visual specification language for object modeling. UML further provides a general-purpose modeling language that includes a graphical notation used to create an abstract model of a system, referred to as a UML model. UML attempts to achieve compatibility with a wide variety of available implementation languages. UML is considered a bloated and complex language that contains many diagrams and constructs that make learning and adopting UML difficult.

Object process methodology (OPM) depicts systems using object models and process models. OPM employs a specialized tool called an object-process case tool to model processes. OPM employs two types of elements: entities that represent elements of a system (i.e., objects, states and processes); and links (i.e., structural and procedural). A structural link represents a relation between two objects. A procedural link represents a link between an object and a process and indicates a change in the state of the object. OPM employs an object process diagram (OPD) to depict links between objects and processes. OPD utilizes three (3) refinement and abstraction mechanisms to handle the complexity of a process. The three mechanisms include: (1) zooming in and out; (2) folding and unfolding; and (3) state expression and suppression. OPM also includes an object process language (OPL) used to translate an OPD into a natural language text string that may be interpretable by a computer. OPD imposes a learning curve and investment that many organizations may not be positioned to accept.

Organizations often rely on process maps and flow diagrams to inform or update members regarding the performance of various components. However, complex BPM tools and languages impose significant resource and training requirements that prevent organizations from quickly and easily learning to use and understand such tools and languages. New members of an organization, unfamiliar with the processes of the organization, may find the mappings and flow diagrams produced by such complex and sophisticated BPM tools too difficult to comprehend.

The difficulties associated with using overly complex BPM tools and languages may be compounded by, for example, (1) the amount of information required, (2) the levels of detail required to document each process element, and (3) the intricate techniques used to validate each process element. Known systems and methods of applying businesses process modeling principles fail to provide organizations the ability to economically and efficiently understand processes of interest and locate process flaws. The amount of effort required to define processes using complex business process modeling tools and languages may discourage organizations from initiating business process modeling projects, and thereby, prevent organizations from realizing the full benefits of BPM initiatives.

SUMMARY

The disclosed methods and processes for a process model lean notation provide a simplified process definition grammar. Process definition grammar provides an efficient and understandable way to categorize the process elements of a process, and thereby model the process. Process model lean notation, as indicated by the name, takes a minimalist approach to defining processes. Process model lean notation addresses many of the shortcomings imposed by known BPM tools and languages by avoiding using graphical notations, and several categories and sub-categories to define process elements. Process definition grammar employs a natural language text notation to assign two interrelated levels of categorization to each process element of a process. Because process model lean notation limits process categorizations to two interrelated levels and utilizes concise natural language text notation for the process definition grammar, easily understandable process categorizations can be quickly produced. Each process element within a process may be assigned a first process level tag and a corresponding second process level tag dictated by the first process level tag. The first level process categories and corresponding second level process categories are comprehensive, clear and understandable to a person with little or no experience using BPM tools. Process definition grammar may include a process element identifier that is a unique alphanumeric value assigned to each process element that provides a brief description of the corresponding process element. The process element identifier combined with the first process level tag and the second process level tag assigned to each of the individual process elements of the process creates an ordered sequence that reflects the order in which processing may occur for the process.

Process definition grammar may be applied to the process elements of a process to produce a process categorization (e.g., a business process model) that includes column headings corresponding to the process definition grammar, and for each process element, a row entry with values corresponding to each column heading. The process categorization is an easy tool to use and understand to define a process, identify process inefficiencies and refine a process.

The process categorization may be implemented using a spreadsheet and the functionality of the spreadsheet (e.g., filtering and sorting) may be used to quickly view and navigate a process categorization. For example, using the filtering function of a spreadsheet, a process categorization can be filtered to only show process elements of a particular first level tag (e.g., SIPOC). Implementing a process categorization using a spreadsheet may allow process elements to be filtered based on multiple elements of the process definition grammar.

Other systems, methods, and features of the invention will be, or will become, apparent to one with skill in the art, upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 1 illustrates an embodiment of a process categorization template with column headings.

FIG. 2 illustrates another embodiment of a process categorization template with column headings.

FIG. 7 illustrates an example of a process categorization for a process that resolves non-compliance issues.

FIG. 8 illustrates an example of a process categorization for a process that approves a compliance waiver request.

FIG. 9b illustrates an example of a process categorization for a patent filing process for a company.

FIG. 9c further illustrates the example of a process categorization for a patent filing process for a company.

FIG. 12 illustrates another embodiment of process model lean notation memory with the process categorization.

DETAILED DESCRIPTION

Figure 3:
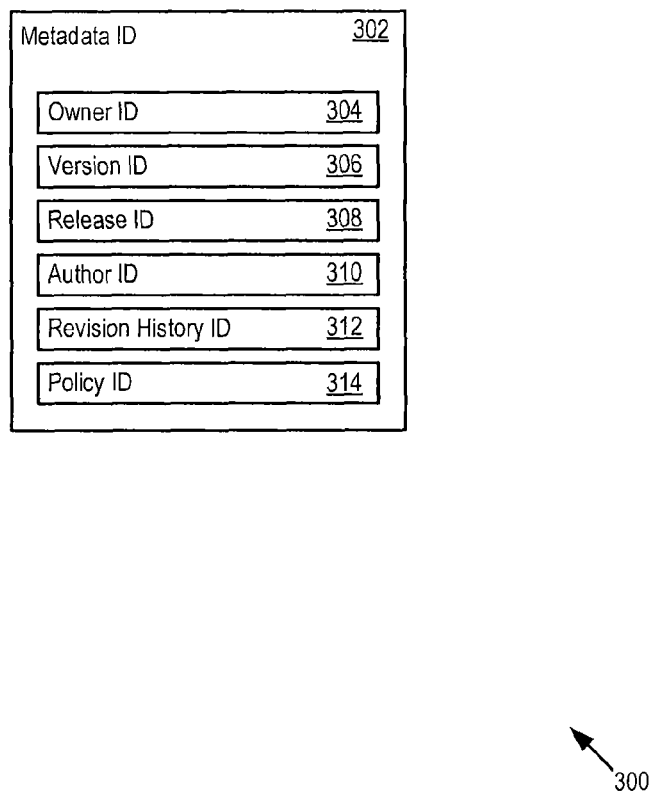
FIG. 3 illustrates an embodiment of the second process level tags that interrelate to the first process level tag of metadata identifier.

Process model lean notation may be implemented in numerous ways, including as a method, a system, and stored on a computer readable medium and executable by a processor in communication with the computer readable medium. Process model lean notation provides a process definition grammar that employs two interrelated process level categories used to assign each process element a first process level tag and an interrelated second process level tag. Process definition grammar also provides a process element identifier that together with the first process level tag and the second process level tag assigned to the process elements of a process creates an ordered sequence that reflects the order in which processing may occur for the process.

Process definition grammar includes first process level tags that represent high-level process categories (first level process categories) in which a process element may be categorized. The first process level tags represent or correspond to the first level process categories: (1) metadata; (2) supplier-input-process-output-customer (SIPOC); (3) process; (4) performance; and (5) methodology. The first level process categories are intended and/or defined to be comprehensive, clear and easily understandable to a person with little or no experience using BPM tools and languages. The first level process categories, in turn, each correspond to interrelated second level process sub-categories. The second process level tags represent or correspond to the second level process sub-categories that interrelate to the first level process categories.

The (1) metadata category interrelates to sub-categories, topics and/or data about a process, including: an owner; a version; a release date; an author; revision history; and/or a policy related to the process. The metadata category provides a way to categorize process elements that improve the understanding, characteristics, and management of data about a process. These sub-categories, topics and/or data correspond to the second level process tags which, in turn, correspond to a specific first level process tag indicated by the metadata category.

The (2) SIPOC category interrelates to sub-categories, topics and/or data that represent a supplier, input, a requirement of the input, an output, a requirement of the output, and/or a customer of the process. The SIPOC category employs the elements of a tool used in the Six Sigma methodology referred to as a SIPOC diagram, also known as a high level process map that is used to identify all the relevant elements of a process improvement project before work begins. These sub-categories, topics and/or data correspond to the second level process tags which, in turn, correspond to a specific first level process tag indicated by the SIPOC category.

The (3) 'process' category interrelates to sub-categories, topics and/or data that represent a type of logical processing, including: sequential; conditional; loop; a process call; a process state; and/or a process state change. These sub-categories, topics and/or data correspond to the second level process tags which, in turn, correspond to a specific first level process tag indicated by the 'process' category.

The (4) performance category interrelates to sub-categories, topics and/or data that represent a performance goal, a performance factor, an auxiliary performance measurement, a performance measurement, and/or a performance factor-measurement relationship. These sub-categories, topics and/or data correspond to the second level process tags which, in turn, correspond to a specific first level process tag indicated by the performance category.

The (5) methodology category interrelates to sub-categories, topics and/or data that represent an element of a methodology. For example, a methodology may specify certain requisite activities for a process, the evidence of which a process element assigned that methodology category may represent. These sub-categories, topics and/or data correspond to the second level process tags which, in turn, correspond to a specific first level process tag indicated by the Methodology category.

Process model lean notation also provides a workflow aspect that indicates, for each process element, an actor responsible for: a task being performed to produce a work product; a machine used to produce the work product; the work product expected as a result of completing the task; and the task.

FIG. 1 illustrates an embodiment of a process categorization template 100 with column headings corresponding to the process definition grammar, including: 'first and second process level tags' 102; 'process element identifier' 104; 'actor role identifier' 106, 'machine identifier' 108; 'work product identifier' 110; 'process element complete (PEC) indicator' 112; and 'task identifier' 114. FIG. 1 further illustrates, under the 'first and second process level tags' 102 column heading, the first process level tag and second process level tag combinations corresponding to first level process categories of: metadata 302 (e.g., 116, 118, 120, 122, 124, and 126); a methodology identifier 128; and a process 602 (e.g., 130, 132, 134, 136, 138, 140, and 142).

FIG. 2 illustrates another embodiment of a process categorization template 200 that includes, under the 'first and second process level tags' 102 column heading, first process level tag and second process level tag combinations corresponding to first level process categories of: SIPOC 402 (e.g., 202, 204, 206, 208, 210, 212, 214 and 216); and performance 502 (e.g., 218, 220, 222, 224, and 226). Each row entry corresponding to the column headings of the process categorization template (e.g., 102, 104, 106, 108, 110, 112, and 114) may be preconfigured so that the values are presented in a pull-down menu list.

Figure 9A:
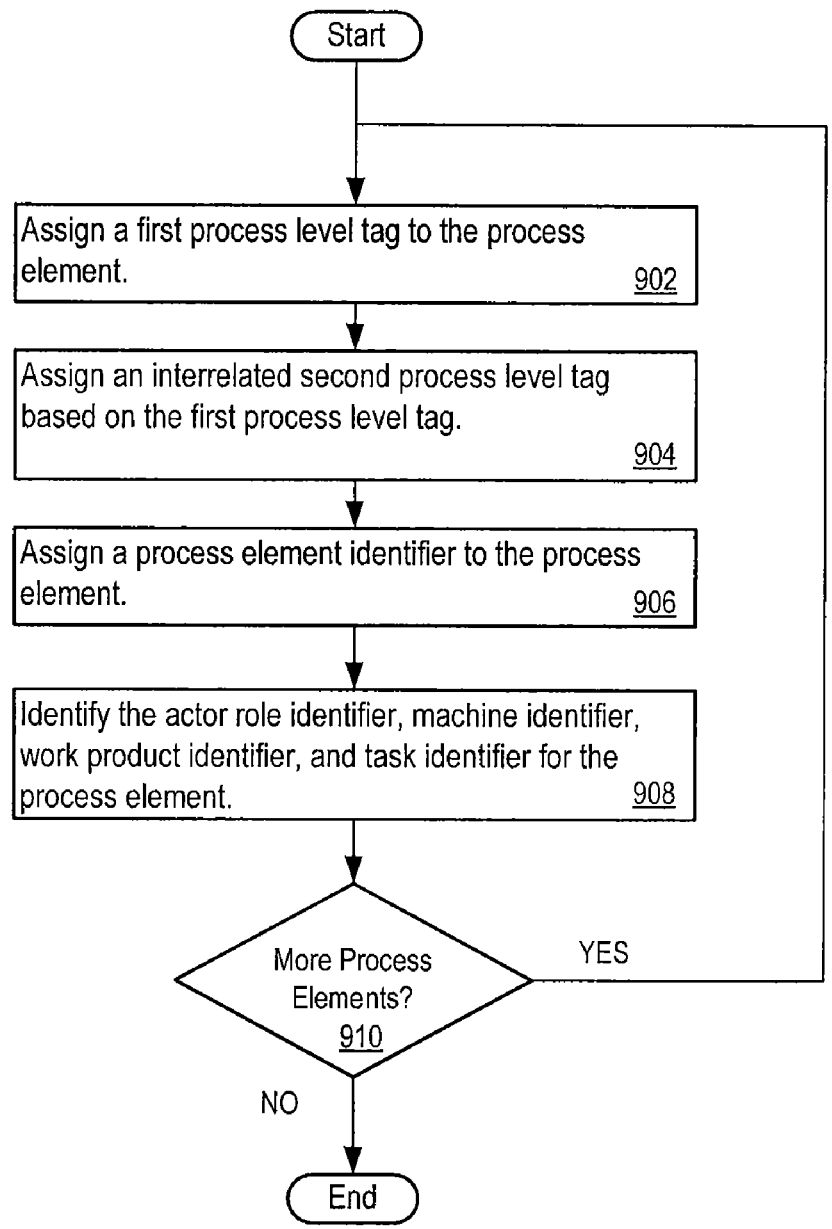
FIG. 9a shows the logic flow that may be used to apply process definition grammar to categorize the process elements of a process.

Referring briefly to FIGS. 9a, 9b and 9c. FIG. 9a illustrates an exemplary logic flow 900a that may be used to apply process definition grammar to categorize the process elements of a process. For each process element, a first process level tag may be assigned (902) and an interrelated second process level tag based on the first process level tag may be assigned (904). A process element identifier may be assigned to each process element (906). An actor role identifier, work product identifier, machine identifier, and the task identifier may be assigned to each process element (908). Where no additional process elements are identified for categorization, the process categorization of the process elements includes an ordered sequence of the process elements (910).

FIGS. 9b and 9c illustrate an example of a process categorization for a patent filing process for a company. The task identifiers (e.g., 912-924 and 929-941) provide a short description of each process element of the patent filing process for the company. Pseudo code may be used as the task identifiers values to describe the logical processing of the process elements of a process. Each process element may be assigned a first process level tag and a second process level tag (e.g., 942-954 and 955-967). Each process element may be further assigned a process element identifier (e.g., 968-974 and 975-976).

The patent filing process, as categorized, may be identified by the title "patent filing process" 968 and the owner of this process may be identified by the company name 969. The patent filing process 968 may be developed and refined through multiple versions (e.g., version 01.) 970. The release date 971 of the version 970 may be expressed as a date (e.g., mm/dd/yyyy). The patent filing process 968 may have one or more authors 972. The patent filing process 968 may correspond to a particular company policy, for example, a disclosure requirement 973 policy that requires invention disclosures be submitted to the company's intellectual property department. The patent filing process 968 may identify an inventor 974 as a supplier to the patent filing process 968, and the inputs to the process may include ideas 919, that are novel and non-obvious 920. The patent filing process 968 includes documenting an idea 921, submitting the idea in a disclosure form 922, reviewing the disclosure form 923, drafting a patent application 924 and reviewing and signing the patent application 929.

An actor role identifier (e.g., 977-978), machine identifier (e.g., 983-986) and work product identifier (e.g., 989-992) may be assigned to each process element. An attorney 977 may use an email software 983 application to send an email 989 to the inventor 978 (e.g., inventor name 974) to review the disclosure. During the course of preparing the patent application, while clarifications are needed 931, additional documentation may be needed 932. The inventor 978 may use an authoring tool 984 to produce additional documents 990. The inventor 978 may submit the additional documentation 934 using the email software 983 application to send the additional documentation in an email 989 to the attorney 977. The attorney 977 may use a meeting scheduling software 985 application to schedule a disclosure review meeting 935 with the inventor and the meeting scheduling software may produce a meeting identifier 991 that the inventor and attorney use to participate in the meeting. The attorney 977 and inventor 978 may use the telephone 986 to conduct the disclosure review meeting 936 and the meeting may result in action items 992 for the attorney and/or inventor. The attorney 977 may use the email software 983 application to send a report of the disclosure review meeting in an email 989. When no more clarifications are needed 938, the patent application is filed with the patent office 939, and the company 975 (e.g., the customer and beneficiary of the patent filing process 940) receives a patent application filing receipt 976 from the patent office 941.

FIGS. 3 through 8, discussed below, correspond and provide additional details, embodiments and descriptions of the process definition grammar utilized and discussed in connection with FIGS. 9a through 9c.

Returning to FIG. 3, an embodiment of the second process level tags 300 that interrelate to the first process level tag of metadata identifier 302 is illustrated. A process element assigned the metadata identifier 302 indicates that the process element represents data about the corresponding process. A second process level tag interrelating to the metadata identifier 302 may be assigned to a process element from the group consisting of: an owner identifier 304; a version identifier 306; a release identifier 308; an author identifier 310; a revision history identifier 312; and a policy identifier 314.

The owner identifier 304 corresponds to a process element that identifies an owner of the process. The owner of a process may be identified as a person, a team, a department within an organization, system and another process. A process element assigned the first process level tag of metadata identifier 302 and second process level tag of owner identifier 304 may be identified by the process model lean notation of Meta.Owner 116.

The version identifier 306 may be assigned to a process element that identifies the current version of the process being categorized. A process element assigned the first process level tag of metadata identifier 302 and second process level tag of version identifier 306 may be identified by the process model lean notation of Meta.Version 120.

The release identifier 308 may be assigned to a process element that identifies the release date of the current version of the process being categorized so that the version identifier 306 and the release identifier 308 correspond. A process element assigned the first process level tag of metadata identifier 302 and second process level tag of release identifier 308 may be identified by the process model lean notation of Meta.Rel 118.

The author identifier 310 may be assigned to process elements that identify the author(s) of the process being categorized. The author identifier 310 may be assigned to multiple process elements according to the number of authors of the process being categorized. A process element assigned the first process level tag of metadata identifier 302 and second process level tag of author identifier 310 may be identified by the process model lean notation of Meta.Author 122.

The revision history identifier 312 may be assigned to each process element that identifies a revision history summary for a related release of the process being categorized. For example, for each process element assigned a release identifier 308, a corresponding process element may be assigned a revision history identifier 312. A process element assigned the first process level tag of metadata identifier 302 and second process level tag of revision history identifier 312 may be identified by the process model lean notation of Meta.RevHistory 124.

The policy identifier 314 may be assigned to each process element that identifies a policy corresponding to the process being categorized. A process element assigned the first process level tag of metadata identifier 302 and second process level tag of policy identifier 314 may be identified by the process model lean notation of Meta.Policy 126. The process categorization may include process elements assigned the metadata identifier 302 in any particular order.

Figure 4:
FIG. 4 illustrates another embodiment of the second process level tags that interrelate to the first process level tag of SIPOC identifier.

FIG. 4 illustrates another embodiment of the second process level tags 400 that interrelate to the first process level tag of SIPOC identifier 402. A process element assigned the SIPOC identifier 402 indicates that the process element represents a supplier, input, a requirement of the input, an output, a requirement of the output, and/or a customer of the process. A second process level tag that corresponds to the SIPOC identifier 402 may be assigned to a process element from the group consisting of: a SIPOC process identifier 404, a supplier identifier 406, input identifier 408, input requirement identifier 410, output identifier 412, output requirement identifier 414 and a customer identifier 416.

The SIPOC process identifier 404 may be assigned to a process element that identifies the process. A process element assigned the first process level tag of SIPOC identifier 402 and the second process level tag of SIPOC process identifier 404 may be identified by the process model lean notation of SIPOC.ProcID 202. A first process element assigned the first process level tag of SIPOC identifier 402 and the second process level tag of SIPOC process identifier 404 (e.g., SIPOC.ProcID 202) may precede a second process element assigned the first process level tag of SIPOC identifier 402 and any other of the second process level tags that interrelate to the first process level tag of SIPOC identifier 402.

The supplier identifier 406 may be assigned to each process element that identifies a supplier to a corresponding SIPOC process. A process element assigned the first process level tag of SIPOC identifier 402 and the second process level tag of supplier identifier 406 may be identified by the process model lean notation of SIPOC.Supp 204.

The input identifier 408 may be assigned to each process element that corresponds to an input from a supplier identified by a process element assigned the supplier identifier 406. A process element assigned the first process level tag of SIPOC identifier 402 and the second process level tag of input identifier 408 may be identified by the process model lean notation of SIPOC.In 206. A first process element assigned the first process level tag of SIPOC identifier 402 and the second process level tag of supplier identifier 406 (e.g., SIPOC.Supp 204) may be followed by a second process element assigned the first process level tag of SIPOC identifier 402 and the second process level tag of input identifier 408 (e.g., SIPOC.In 206).

The input requirement identifier 410 may be assigned to each process element that corresponds to a requirement for an input from a supplier to a corresponding SIPOC process. A process element assigned the first process level tag of SIPOC identifier 402 and the second process level tag of input requirement identifier 410 may be identified by the process model lean notation of SIPOC.InReq 208.

The output identifier 412 may be assigned to each process element that corresponds to an output from a corresponding SIPOC process. A process element assigned the first process level tag of SIPOC identifier 402 and the second process level tag of output identifier 412 may be identified by the process model lean notation of SIPOC.Out 214.

The output requirement identifier 414 may be assigned to each process element that corresponds to a requirement for an output from a corresponding SIPOC process. A process element assigned the first process level tag of SIPOC identifier 402 and the second process level tag of output requirement identifier 414 may be identified by the process model lean notation of SIPOC.OutReq 216.

The customer identifier 416 may be assigned to each process element that corresponds to a customer of a SIPOC process. The customer of a SIPOC process may include a person, team, a department within an organization, system and another process. A process element assigned the first process level tag of SIPOC identifier 402 and the second process level tag of customer identifier 416 may be identified by the process model lean notation of SIPOC.Cust 212. A first process element assigned the first process level tag of SIPOC identifier 402 and the second process level tag of customer identifier 416 (e.g., SIPOC.Cust 212) may be followed by a second process element assigned the first process level tag of SIPOC identifier 402 and the second process level tag of output identifier 412 (e.g., SIPOC.Out 210).

Figure 5:
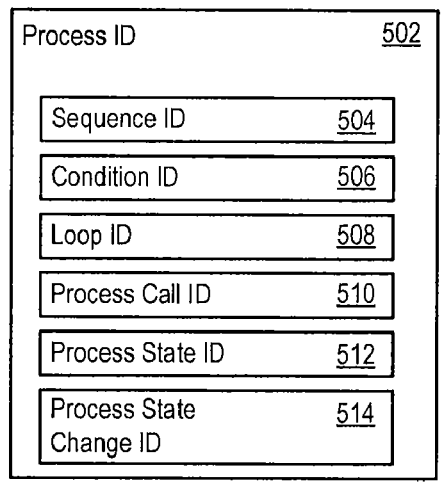
FIG. 5 illustrates another embodiment of the second process level tags that interrelate to the first process level tag of 'process' identifier.

FIG. 5 illustrates another embodiment of the second process level tags 500 that interrelate to the first process level tag of 'process' identifier 502. A process element assigned the process identifier 502 indicates that the process element represents a type of logical processing, including: sequential; conditional; loop; a process call; a process state; and a process state change. A second process level tag that corresponds to the process identifier 502 may be assigned to a process element from the group consisting of: a sequence identifier 504, a condition identifier 506, loop identifier 508, process call identifier 510, process state identifier 512, and process state change identifier 514. A first process element assigned the first process level tag of SIPOC identifier 402 and the second process level tag of input requirement identifier 410 (e.g., SIPOC.InReq 208) may be followed by a second process element assigned the first process level tag of process identifier 502 and any other second process level tag that interrelates to the first process level tag of process identifier 502.

The sequence identifier 504 may be assigned to each process element that identifies sequential processing performed by a process. A process element assigned the first process level tag of process identifier 502 and the second process level tag of sequence identifier 504 may be identified by the process model lean notation of Proc.Seq 130.

The condition identifier 506 may be assigned to each process element that corresponds to conditional processing performed by a process. A process element assigned the first process level tag of process identifier 502 and the second process level tag of condition identifier 506 may be identified by the process model lean notation of Proc.Cond 132. A first process element assigned the first process level tag of process identifier 502 and the second process level tag of condition identifier 506 (e.g., Proc.Cond 132) may be followed by a second process element assigned the first process level tag of process identifier 502 and the second process level tag of sequence identifier 504 (e.g., Proc.Seq 130).

The loop identifier 508 may be assigned to each process element that corresponds to iterative processing (e.g., a "for loop" or "do while loop") performed by a process. A process element assigned the first process level tag of process identifier 502 and the second process level tag of loop identifier 508 may be identified by the process model lean notation of Proc.Loop 134. A first process element assigned the first process level tag of process identifier 502 and the second process level tag of loop identifier 508 (e.g., Proc.Loop 134) may be followed by at least one process element assigned the first process level tag of process identifier 502 and any other second process level tag that interrelates to the first process level tag of process identifier 502.

The process call identifier 510 may be assigned to each process element that corresponds to a call to a second process and/or a sub-process of a first process. A first process element assigned the first process level tag of process identifier 502 and the second process level tag of process call identifier 510 may be identified by the process model lean notation of Proc.Call 136.

The process state identifier 512 may be assigned to each process element that corresponds to state information (e.g., the context of processing) for the process being categorized. The process state identifier 512 corresponds to a process element that identifies and/or establishes the context in which processing is performed by a process. A first process element assigned the first process level tag of process identifier 502 and the second process level tag of process state identifier 512 may be identified by the process model lean notation of Proc.State 140. A first process element assigned the first process level tag of process identifier 502 and the second process level tag of process state identifier 512 (e.g., Proc.State 140) may be followed by at least one process element assigned the first process level tag of process identifier 502 and the second process level tag of sequence identifier 504 (e.g., Proc.Seq 130).

The process state change identifier 514 may be assigned to each process element that corresponds to state change information for a process. A process element assigned the process state change identifier 514 may be identified by the process model lean notation of Proc.StateChg 142. A first process element assigned the first process level tag of process identifier 502 and the second process level tag of process state change identifier 514 (e.g., Proc.StateChg 142) may precede at least one process element assigned the first process level tag of process identifier 502 and the second process level tag of process state identifier 512 (e.g., Proc.State 140).

The process state identifier 512 and process state change identifier 514 provide a way to define the automata of a process (e.g., a state machine). The process state identifier 512 reflects the context under which processing occurs until a condition and/or event result in a state change reflected by the process state change identifier 514. The process elements, process state identifiers 512 and/or a process state change identifiers 514 of a process may be analyzed to identify an optimal number of states (e.g., minimize the number of states) and process elements necessary to perform the functions of the process.

Table 1 illustrates an example of a process identified as a 'check status' process that includes eight (8) process elements. Each line of Table 1 may represent a process element of the process 'check status' to which the process definition grammar of the process model lean notation may be applied. Line 1 of Table 1 may be categorized as a process state that indicates the context in which succeeding process elements perform. Line 2 of Table 1 may be categorized as a first conditional process element, while lines 3 and 4 may be categorized as sequential process elements corresponding to the first conditional process element of line 2. Line 5 of Table 1 may be categorized as a second conditional process element corresponding to the first conditional process element, and line 6 may be categorized as a sequential process element corresponding to the second conditional process element of line 5. Line 7 of Table 1 may be categorized as a third conditional process element corresponding to the first and second conditional process elements, and line 8 may be categorized as a process state change that indicates that the context has changed.

TABLE 1

Process Elements for a Check Status Process

1 Check__Changed__Status := True;
2 If Status__Changed = True then
3   Evaluate__Status__Value;
4   Clear__Status__Value;
5 Else
6   Set__Status__Value;
7 End if
8 Check__Changed__Status := False;

Table 2 illustrates first process level tag and second process level tag combinations and process element identifiers assigned to the process elements of the process shown in Table 1. Table 2 illustrates that the first process level tag and second process level tag together with the process element identifier create an ordered sequence of process elements. Table 2 illustrates that multiple process elements may be assigned the first process level tag and second process level tag combinations of Proc.Seq (e.g., lines 3, 4 and 6), while a process element identifier that conforms to a naming convention (e.g., SD_Condition1_Sequence1, SD_Condition1_Sequence2 and SD_Condition2_Sequence1) combined with the first process level tag and second process level tag combinations create an ordered sequence of process elements. Table 2 further illustrates that multiple process elements assigned the first process level tag and second process level tag combinations of Proc.Cond (e.g., lines 2, 5 and 7) and process element identifiers that conform to a naming convention (e.g., SD_Condition1, SD_Condition2 and SD_Condition3) create an ordered sequence of process elements. Table 2 also illustrates that where at least one process element is assigned the first process level tag and second process level tag combination of Proc.State and a process element identifier that conforms to a naming convention (e.g., State_Description) another process element assigned the first process level tag and second process level tag combination of Proc.StateChg and a process element identifier that conforms to that naming convention (e.g., SD_State_Chg_Description) creates an ordered sequence of process elements. The process element identifier, together with the first process level tag and second process level tag, create an ordered sequence of process elements that reflects the order in which processing may occur for a process.

TABLE 2

Ordered Sequence of Process Elements

| | First and Second Process Level Tags | Process element identifier |
|---|---|---|
| 1 | Proc.State | State_Description (SD) |
| 2 | Proc.Cond | SD_Condition1 |
| 3 | Proc.Seq | SD_Condition1_Sequence1 |
| 4 | Proc.Seq | SD_Condition1_Sequence2 |
| 5 | Proc.Cond | SD_Condition2 |
| 6 | Proc.Seq | SD_Condition2_Sequence1 |
| 7 | Proc.Cond | SD_Condition3 |
| 8 | Proc.StateChg | SD_State_Chg_Description |

Figure 6:
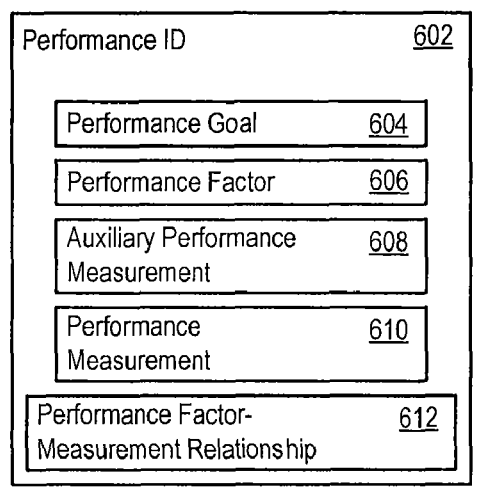
FIG. 6 illustrates another embodiment of the second process level tags that correspond to the first process level tag of performance identifier.

FIG. 6 illustrates another embodiment of the second process level tags 600 that correspond to the first process level tag of performance identifier 602. A process element assigned the performance identifier 602 indicates that the process element represents a performance goal, a performance factor, an auxiliary performance measurement, a performance measurement, and/or a performance factor-measurement relationship. A second process level tag that interrelates to the first process level tag of performance identifier 602 may be assigned to a process element from the group consisting of: a performance goal 604; a performance factor 606; an auxiliary performance measurement 608; a performance measurement 610; and a performance factor-measurement relationship 612.

The performance goal 604 may be assigned to each process element that identifies a performance goal (e.g., target performance) for a process. A process element assigned the first process level tag of performance identifier 602 and the second process level tag of performance goal 604 may be identified by the process model lean notation of Perf.Goal 220.

The performance factor 606 may be assigned to each process element that corresponds to a factor related to the performance of a process. A process element assigned the first process level tag of performance identifier 602 and the second process level tag of performance factor 606 may be identified by the process model lean notation of Perf.X 222.

The auxiliary performance measurement 608 may be assigned to each process element that identifies an intermediate performance measurement of the output of a process.

The auxiliary performance measurement 608 may be assigned to each process element that identifies an intermediate performance measurement of the output of a sub-process of a process. A process element assigned the first process level tag of performance identifier 602 and the second process level tag of auxiliary performance measurement 608 may be identified by the process model lean notation of Perf.Aux 224.

The performance measurement 610 may be assigned to each process element that corresponds to the performance measurement of the output of a process. The performance measurement 610 may be assigned to each process element that corresponds to the performance measurement of the output of a sub-process to a process. A process element assigned the first process level tag of performance identifier 602 and the second process level tag of performance measurement 610 may be identified by the process model lean notation of Perf.Y 218.

The performance factor-measurement relationship 612 may be assigned to each process element that identifies relationship information between performance factors, auxiliary performance measurements and performance measurements corresponding to a process. A process element assigned the first process level tag of performance identifier 602 and the second process level tag of performance factor-measurement relationship 612 may be identified by the process model lean notation of Perf.F(X) 226. A first process element assigned the first process level tag of performance identifier 602 and the second process level tag of performance factor 606 (e.g., Perf.X 222) may be followed by a second process element corresponding to the same process assigned the first process level tag of performance identifier 602 and the second process level tag of performance factor-measurement relationship 610 (e.g., Perf.F(x) 226).

A process element assigned the first process level tag of methodology identifier 128 indicates that the process element represents an element of a methodology. A process element assigned the first process level tag of Methodology identifier 128 may be assigned a second process level tag of null value. The first process level tag of Methodology identifier 128 may refer to any number of methodologies (e.g., Capability Maturity Model® Integration (CMMI), Six Sigma, PmBok®, and Lean methodology). For example, a process element that maps to the Capability Maturity Model® Integration (CMMI) methodology may be assigned a first process level tag of 'CMMI' and a null value for the second process level tag. A process element assigned the first process level tag of methodology identifier 128 may be assigned a non-null value for the second process level tag based on the methodology identified by the methodology identifier 128 and/or the preference of the user.

In one implementation, the Methodology identifier 128 comprises the value 'methodology' for the first process level tag so that process elements that correspond to any methodology may be easily identified (e.g., filtering process elements in a categorization based on the first process level tag value of 'methodology'). The second process level tag of a process element, assigned the methodology identifier 128 value 'methodology' for the first process level tag, may refer to a specific methodology (e.g., Capability Maturity Model® Integration (CMMI), Six Sigma, PmBok®, and Lean methodology). For example, a first process element that maps to the Capability Maturity Model® Integration (CMMI) methodology may be assigned a first process level tag value of 'methodology' and a second process level tag value of 'CMMI'. While a second process element that maps to the Six Sigma® methodology may be assigned a first process level tag value of 'methodology' and a second process level tag value of 'SixSigma'. The process categorization can be filtered to show only those process elements corresponding to methodologies (e.g., any methodology) because the first process element and the second process element are assigned the first process level tag value of 'methodology'. The ability to filter process elements according to whether the process elements correspond to methodologies provides a way to perform detailed analysis and identify possible interrelationships between process elements and various methodologies.

Although process definition grammar may be applied so that process elements assigned the same first process level tag create an ordered sequence of process elements, process elements assigned different first process level tags may not correspond to any particular ordered sequence. For example, a process categorization may include a first process element assigned the metadata identifier 302 and a second process element assigned the SIPOC identifier 402 with no restriction as to the order in which the first process element and second process element are presented. However, a process categorization may reflect a first process level tag preference so that process elements assigned different first process level tags correspond to a preferred ordered sequence. For example, process elements assigned the metadata identifier 302 may precede other process elements assigned the SIPOC identifier 402 in a process categorization, in order to create a preferred ordered sequence of process elements.

FIG. 7 illustrates an example of a process categorization 700 for a process that resolves non-compliance issues. The ordered sequence of process elements includes a first process element assigned the first process level tag and second process level tag combination Proc.Loop 702 (e.g., the process identifier 502 and the loop identifier 508), a process element identifier 704 of "non-compliance loop 1", and a task identifier 706 value of "for each identified non-compliance issue". The process element categorized by 702-704-706 indicates that the process element corresponds to a "for loop".

The next process element, in the ordered sequence of process elements, is assigned the first process level tag and second process level tag combination Proc.State 708 (e.g., the process identifier 502 and the process state identifier 512), a process element identifier 710 of "solving1", and a task identifier 712 of "resolution of non-compliance" 712. The process element categorized by 708-710-712 indicates that the process element identifies and/or establishes the context (e.g., "solving") in which related process elements perform.

The next process element is assigned the first process level tag and second process level tag combination Proc.Seq 714 (e.g., the process identifier 502 and the sequence identifier 504), a process element identifier 716 of "solving_seq1", the actor role identifier 718 of "Actor 3", the machine identifier 720 of process element machines (PEM), the work product identifier 722 of "defect 1", and a task identifier 724 of "define the action to be performed". The process element categorized by 714-716-718-720-722-724 indicates that "Actor 3" is responsible for the tasks performed using the PEM to produce the "defect 1" work product.

The first process element assigned the first process level tag and second process level tag combination Proc.State 708 and a process element identifier 710 of "solving1" followed by the second process element assigned the first process level tag and second process level tag combination Proc.Seq 714 and a process element identifier 716 "solving1_seq1" creates an ordered sequence. Where multiple process elements are assigned the same first process level tag and second process level tag combination (e.g., "Proc.Seq" 714, 726, 730, and 734), process element identifiers that conform to a naming convention (e.g., 'solving1_seq1 ' 716, 'solving1_seq2' 728, 'solving1_seq2' 732, and 'solving1_seq2 ' 736) create an ordered sequence of process elements. The first process element assigned the first process level tag and second process level tag combination Proc.StateChg 746 is preceded by at least one other process element assigned the first process level tag and second process level tag combination Proc.State (e.g., 708 and 738). Where a first process element and a second process element are assigned the first process level tag and second process level tag combination Proc.Loop (e.g., 702 and 762), process element identifiers that conform to a naming convention (e.g., "non-compliance_loop1 " 704 and "non-compliance_loop2 " 764) create an ordered sequence of process elements.

FIG. 8 illustrates an example of a process categorization 800 for a process that approves a compliance waiver request. The ordered sequence of process elements includes a first process element assigned the first process level tag and second process level tag combination Proc.State 802 (e.g., the process identifier 502 and process state identifier 512), a process element identifier 804 of "waiver requested 1", and a task identifier 806 of "compliance waiver requested". The process element categorized by 802-804-806 indicates that the process element identifies and/or establishes the context (e.g., "waiver requested") in which related process elements perform.

The next process element is assigned the first process level tag and second process level tag combination Proc.Cond 808 (e.g., the process identifier 502 and the condition identifier 506), a process element identifier 810 of "waiver requested conditional 1", and a task identifier 812 of "if waiver requires approval". The process element categorized by 808-810-812 indicates that the process element corresponds to conditional processing where approval of a waiver may be required.

The first process element assigned Proc.Cond 808 and a process element identifier 810 of "waiver conditional 1" followed by the second process element assigned the first process level tag and second process level tag combination Proc.Seq 814 and a process element identifier 816 of "waiver conditional 1 sequence 1" creates an ordered sequence. Where multiple process elements are assigned the same first process level tag and second process level tag combination (e.g., Proc.Seq 814, 818, and 826), process element identifiers that conform to a naming convention (e.g., 'waiver conditional 1 sequence 1 ' 816, 'waiver conditional 1 sequence 2 ' 820, and 'waiver conditional 2 sequence 1 ' 828) create an ordered sequence of process elements. Where multiple process elements are assigned the same first process level tag and second process level tag combination (e.g., Proc.Cond 808, 822, and 830), process element identifiers that conform to a naming convention (e.g., 'waiver conditional 1 ' 810, 'waiver conditional 2 ' 824, and 'waiver conditional 3 ' 832) create an ordered sequence of process elements.

Figure 10:
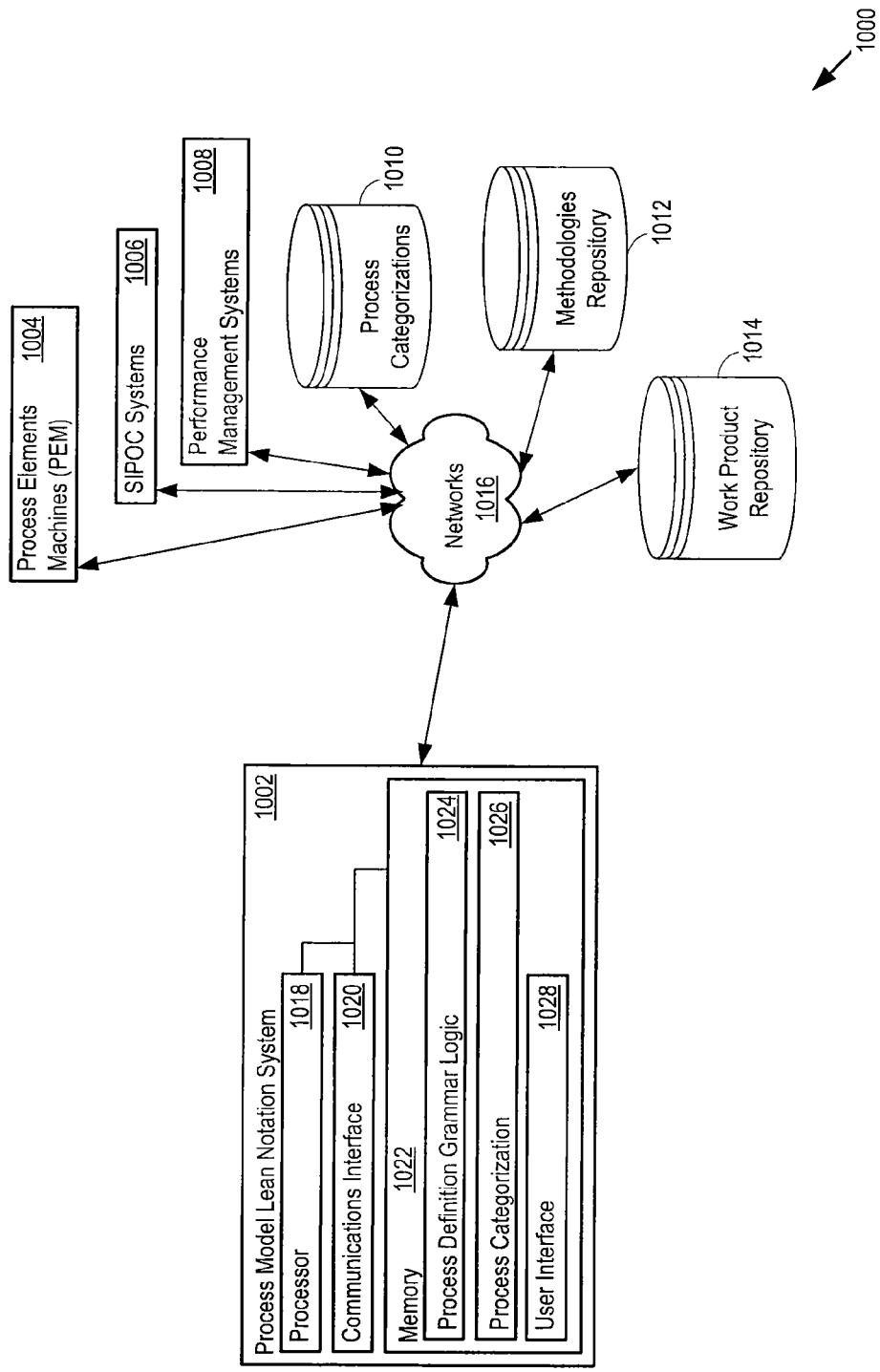
FIG. 10 illustrates an embodiment of a process model lean notation system as a component of a process model lean notation system configuration.

FIG. 10 illustrates an embodiment of a process model lean notation system 1002 as a component of a process model lean notation system configuration 1000. Process model lean notation system configuration 1000 may further include process elements machines (PEM) 1004, SIPOC systems 1006, and performance management systems 1008. The process elements machines (PEM) 1004 may include electronic and non-electronic tools such as e-mail applications and systems, and productivity systems and applications. Process model lean notation system configuration 1000 may further include various repositories and/or databases, including a repository of process categorizations 1010 where process categorizations are stored for later retrieval and use, methodologies repository 1012 and work product repository 1014. The various components of the process model lean notation system configuration 1000 may be connected to a network 1016 (e.g., the Internet). Process model lean notation system 1002 includes a processor 1018, a communication interface 1020 and a memory 1022 used to communicate to the various components of the process model lean notation system configuration 1000. The memory 1022 may include process definition grammar logic 1024, a process categorization 1026 and a user interface 1028 used to view and manipulate the process categorization 1026. The processor 1018 is operable to execute the process definition grammar logic 1024 to produce the process categorization 1026. A user may apply the process definition grammar logic 1024 to each process element of a process to produce the process categorization 1026.

The process definition grammar logic 1024 may communicate with the SIPOC systems 106 to receive the process elements corresponding to the SIPOC identifier 402. Process definition grammar logic 1024 may communicate with the performance management systems 1008 to receive the process elements corresponding to the performance identifier 502. The performance management systems 1008 may include enterprise resource management, project management and various activity monitoring systems.

Figure 11:
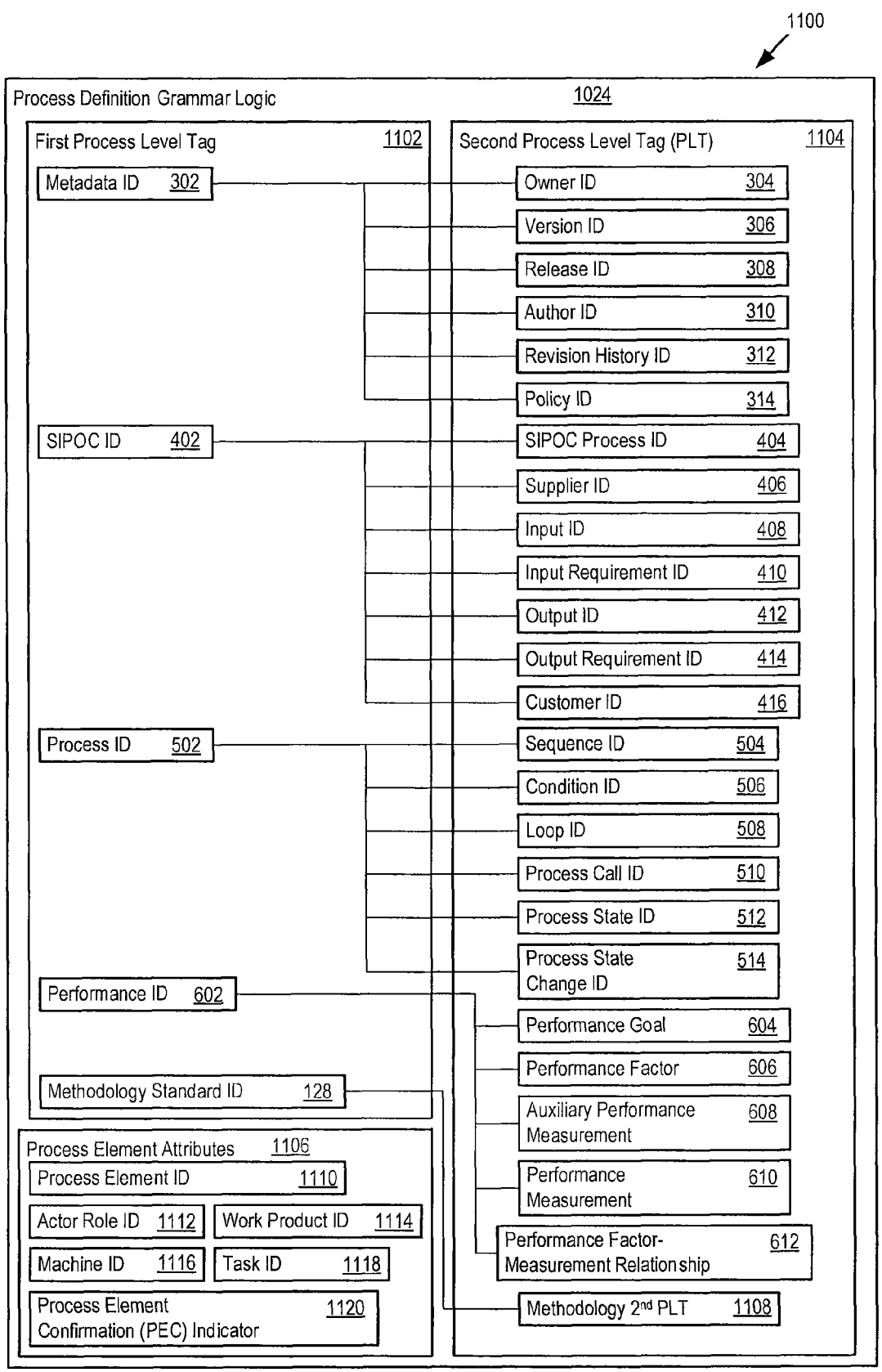
FIG. 11 illustrates another embodiment of process model lean notation memory with process definition grammar logic.

FIG. 11 illustrates another embodiment of process model lean notation memory 1100 with process definition grammar logic 1024. Process definition grammar logic 1024 includes first process level tags 1102, second process level tags 1104 and process element attributes 1106. Process definition grammar logic 1024 determines a first level process category and an interrelated second level process sub-category for each process element and assigns a corresponding first process level tag 1102 and an interrelated second process level tag 1104 to each of the process elements of a process.

For example, the first process level tag of methodology identifier 128 identifies process elements that map to a methodology (e.g., the first level process category), while an interrelated second process level tag corresponding to the first process level tag of methodology identifier 128 may include any second level process sub-category of the methodology identified by the methodology identifier 128 (e.g., methodology $2^{nd}$ process level tag 1108). Process definition grammar logic 1024 may communicate with the methodologies repository 1012 to receive the process elements assigned the first process level tag of methodology identifier 128 and the second process level tag of methodology $2^{nd}$ process level tag 1108.

Process definition grammar logic 1024 may assign each process element a process element identifier 1110. The process element identifier 1110 may comprise a unique alphanumeric value that provides a brief description of the corresponding process element. Process definition grammar logic 1024 may assign, for each process element, an actor role identifier 1112, work product identifier 1114, machine identifier 1116, and task identifier 1118.

The process elements machines (PEM) 1004 may interact with the work product repository 1014 to generate work product, and store and retrieve work product identified by the work product identifier 1114. Process definition grammar logic 1024 may receive the value of each work product identifier 1114 from the work product repository 1014.

Process definition grammar logic 1024 may assign a value (e.g., "verified" and "complete") to a process element confirmation (PEC) indicator 1120, for each process element, that confirms verification and/or execution of the corresponding process element. A user may review the process categorization 1026 to verify each process element and use the user interface 1028 to update the PEC indicator 1120 with a value (e.g., "verified", "complete" and/or the initials of the person completing and/or verifying the process element) for each corresponding process element. Process definition grammar logic 1024 may, for each process element, update the PEC indicator 1120 with a value (e.g., "verified", "complete" and/or the initials of the person completing and/or verifying the process element) based on validating the corresponding process element attributes 1106 using information received from the systems (e.g., 1004, 1006 and 1008) and repositories (e.g., 1010, 1012, and 1014). The PEC indicator 1120 may include a default value (e.g., "unverified" and "incomplete") so that process elements that have not been verified can be quickly identified.

FIG. 12 illustrates another embodiment of process model lean notation memory 1200 with the process categorization 1026. The process categorization 1026 includes an ordered sequence of process elements 1202. Process definition grammar logic 1024 may use the first process level tag 1102 and second process level tag 1103 together with the process element identifier 1110 to create the ordered sequence of process elements 1202. Process model lean notation system 1002 receives process elements (e.g., first process element (FPE) 1204, second process element (SPE) 1206, and Nth process element (NPE) 1208) that define a process. Process definition grammar logic 1024 may use the process categorization 1026 to generate a process mapping of the process. Process definition grammar logic 1024 may complete the ordered sequence of process elements 1202 once process definition grammar logic 1024 assigns each of the process elements of a process a first process level tag 1102 (e.g., 1210, 1212 and 1214), a second process level tag 1104 (e.g., 1216, 1218 and 1220), the process element attributes 1106 (e.g., 1222, 1224 and 1226) and in particular the process element identifier 1110 (e.g., 1228,1230 and 1232).

The systems may be implemented in many different ways. For example, although some features are shown as computer program products embodied as a signal or data stream and/or stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combination of software and hardware. The files, schemas, and messages used by the systems may employ formats that are different from the formats described above.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analogue or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the process model lean notation have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for categorizing a process using a process definition grammar, the method comprising:

assigning a first process level tag and a second process level tag to each process element that defines a process, where the second process level tag is based on the first process level tag, where the first process level tag is from a group consisting of: a metadata identifier; a supplier-input-process-output-customer (SIPOC) identifier; a process identifier; a performance identifier; and a methodology identifier;

where the second process level tag corresponding to the metadata identifier of the first process level tag is from a group consisting of: an owner identifier; a version identifier; a release identifier; an author identifier; a revision history identifier; and a policy identifier;

where the second process level tag corresponding to the SIPOC identifier of the first process level tag is from a group consisting of: a supplier identifier; an input identifier; an input requirement identifier; an output identifier; an output requirement identifier; and a customer identifier;

where the second process level tag corresponding to the process identifier of the first process level tag is from a group consisting of: a sequence identifier; a condition identifier; a loop identifier; a process call identifier; a process state identifier; and a process state change identifier;

where the second process level tag corresponding to the performance identifier of the first process level tag is from a group consisting of: a performance goal; a performance factor; an auxiliary performance measurement; a performance measurement; and a performance factor-measurement relationship; and assigning, for each of the process elements, a process element identifier comprising a unique alphanumeric value to create an ordered sequence of the process elements.

2. The method of claim 1, further comprising assigning, for each of the process elements:

an actor role identifier that identifies an actor involved in producing a work product for the process element, a machine identifier that identifies a tool used by the actor to produce the work product, a work product identifier that identifies the work product that is obtained as a result of the actor using the tool; and a task identifier that identifies a task to be performed.

3. The method of claim 1, wherein for each of the first process level tags, the corresponding second process level tags and process element identifiers in combination indicate the ordered sequence of the process elements corresponding to the first process level tag.

4. The method of claim 3, wherein the ordered sequence includes a first process element assigned the process identifier and the loop identifier followed by at least one process element assigned the process identifier.

5. The method of claim 3, wherein the ordered sequence includes a first process element assigned the SIPOC identifier and the input requirement identifier followed by a second process element assigned the first process level tag of process identifier.

6. The method of claim 3, wherein the ordered sequence includes a first process element assigned the SIPOC identifier and the supplier identifier followed by a second process element assigned the SIPOC identifier and the input identifier.

7. The method of claim 3, wherein the ordered sequence includes a first process element assigned the SIPOC identifier and the customer identifier followed by a second process element assigned the SIPOC identifier and the output identifier.

8. The method of claim 3, wherein the second process level tag corresponding to the SIPOC identifier of the first process level tag is from the group further consisting of: a SIPOC process identifier; and wherein the ordered sequence includes a first process element assigned the SIPOC identifier and the SIPOC process identifier followed by a second process element assigned the SIPOC identifier.

9. The method of claim 1, wherein the ordered sequence includes a first process element assigned the process identifier and the condition identifier followed by a second process element assigned the process identifier and the sequence identifier.

10. The method of claim 9, wherein the ordered sequence includes a third process element assigned the process identifier and the process state identifier followed by at least one process element assigned the process identifier and the sequence identifier.

11. The method of claim 10, wherein the ordered sequence includes a fourth process element assigned the process identifier and the process state change identifier that precedes at least one process element assigned the process identifier and the process state identifier.

12. A product for categorizing a process using a process definition grammar, the product comprising:

a processor;

a machine readable medium in communication with the processor;

logic stored on the medium and executable by the processor to:

assign a first process level tag and a second process level tag to each process element that defines a process, where the second process level tag is based on the first process level tag, where the first process level tag is from a group consisting of: a metadata identifier; a supplier-input-process-output-customer (SIPOC) identifier; a process identifier; a performance identifier; and a methodology identifier;

where the second process level tag corresponding to the metadata identifier of the first process level tag is from a group consisting of: an owner identifier; a version identifier; a release identifier; an author identifier; a revision history identifier; and a policy identifier;

where the second process level tag corresponding to the SIPOC identifier of the first process level tag is from a group consisting of: a supplier identifier; an input identifier; an input requirement identifier; an output identifier; an output requirement identifier; and a customer identifier;

where the second process level tag corresponding to the process identifier of the first process level tag is from a group consisting of: a sequence identifier; a condition identifier; a loop identifier; a process call identifier; a process state identifier; and a process state change identifier;

where the second process level tag corresponding to the performance identifier of the first process level tag is from a group consisting of: a performance goal; a performance factor; an auxiliary performance measurement; a performance measurement; and a performance factor-measurement relationship; and assign, for each of the process elements, a process element identifier to create an ordered sequence of the process elements.

13. The product of claim 12, the logic further executable to assign for each of the process elements:
an actor role identifier that identifies an actor involved in producing a work product for the process element;
a machine identifier that identifies a tool used by the actor to produce the work product;
a work product identifier that identifies the work product that is obtained as a result of the actor using the tool; and
a task identifier that identifies a task to be performed.

14. The product of claim 12, wherein the ordered sequence of the process elements corresponds to the first process level tag, the second process level tag and process element identifier in combination.

15. The product of claim 14, wherein the logic is further executable to assign a first process element the process identifier and the loop identifier followed by at least one process element assigned the process identifier.

16. The product of claim 14, wherein the logic is further executable to assign a first process element the SIPOC identifier and the input requirement identifier followed by a second process element assigned the first process level tag of process identifier.

17. The product of claim 14, wherein the logic is further executable to assign a first process element the SIPOC identifier and the supplier identifier followed by a second process element assigned the SIPOC identifier and the input identifier.

18. The product of claim 14, wherein the logic is further executable to assign a first process element the SIPOC identifier and the customer identifier followed by a second process element assigned the SIPOC identifier and the output identifier.

19. The product of claim 14, wherein the logic is further executable to:
assign the second process level tag corresponding to the SIPOC identifier of the first process level tag from the group further consisting of: a SIPOC process identifier; wherein the ordered sequence includes a first process element assigned the SIPOC identifier and the SIPOC process identifier followed by a second process element assigned the SIPOC identifier.

20. The product of claim 12, wherein the logic is further executable to assign a first process element the process identifier and the condition identifier followed by a second process element assigned the process identifier and the sequence identifier.

21. The product of claim 20, wherein the logic is further executable to assign a third process element the process identifier and the process state identifier followed by at least one process element assigned the process identifier and the sequence identifier.

22. The product of claim 21, wherein the logic is further executable to assign a fourth process element the process identifier and the process state change identifier that precedes at least one process element assigned the process identifier and the process state identifier.

23. A method for categorizing a process using a process definition grammar, the method comprising:
assigning a first process level tag and a second process level tag to each process element that defines a process, where the second process level tag based on the first process level tag;
where the first process level tag is from a group consisting of: a metadata identifier; a supplier-input-process-output-customer (SIPOC) identifier; a process identifier; a performance identifier; and a methodology identifier;
where the second process level tag corresponding to the metadata identifier of the first process level tag is from a group consisting of: an owner identifier; a version identifier; a release identifier; an author identifier; a revision history identifier; and a policy identifier;
where the second process level tag corresponding to the SIPOC identifier of the first process level tag is from a group consisting of: a supplier identifier; an input identifier; an input requirement identifier; an output identifier; an output requirement identifier; and a customer identifier;
where the second process level tag corresponding to the process identifier of the first process level tag is from a group consisting of: a sequence identifier; a condition identifier; a loop identifier; a process call identifier; a process state identifier; and a process state change identifier; and
where the second process level tag corresponding to the performance identifier of the first process level tag is from a group consisting of: a performance goal; a performance factor; an auxiliary performance measurement;
a performance measurement; and a performance factor-measurement relationship; and
assigning, for each of the process elements, a process element identifier comprising a unique alphanumeric value to create an ordered sequence of the process elements.

* * * * *